(12) United States Patent
De Bree et al.

(10) Patent No.: US 7,529,625 B2
(45) Date of Patent: May 5, 2009

(54) METHOD AND SYSTEM FOR ASSESSING PORE FLUID PRESSURE BEHAVIOUR IN A SUBSURFACE FORMATION

(75) Inventors: Philippus De Bree, Rijswijk (NL); Najwa El-Yassir, Rijswijk (NL)

(73) Assignee: Shell Oil Company, Houston, TX (US)

( * ) Notice: Subject to any disclaimer, the term of this patent is extended or adjusted under 35 U.S.C. 154(b) by 273 days.

(21) Appl. No.: 10/576,638

(22) PCT Filed: Oct. 25, 2004

(86) PCT No.: PCT/EP2004/052652

§ 371 (c)(1),
(2), (4) Date: Apr. 21, 2006

(87) PCT Pub. No.: WO2005/040860

PCT Pub. Date: May 6, 2005

(65) Prior Publication Data

US 2007/0083332 A1    Apr. 12, 2007

(30) Foreign Application Priority Data

Oct. 24, 2003    (EP) .................................. 03103958

(51) Int. Cl.
    *G01V 3/18*    (2006.01)
(52) U.S. Cl. .......................................................... 702/9
(58) Field of Classification Search .................. 702/9, 702/14
See application file for complete search history.

(56) References Cited

U.S. PATENT DOCUMENTS

| | | | |
|---|---|---|---|
| 5,081,612 A | 1/1992 | Scott et al. ..................... 367/38 |
| 5,615,115 A * | 3/1997 | Shilling ......................... 702/9 |
| 5,859,367 A | 1/1999 | Holbrook ................. 73/152.05 |
| 6,434,487 B1 | 8/2002 | Thompson ................... 702/14 |
| 6,714,873 B2 * | 3/2004 | Bakulin et al. ................ 702/14 |
| 2003/0125878 A1 | 7/2003 | Bakulin et al. ................ 702/14 |
| 2005/0149267 A1* | 7/2005 | Van Den Beukel et al. .... 702/14 |

OTHER PUBLICATIONS

Olden Peter, et al. "Modelling combined fluid and stress change effects in the seismic response of a producing hydrocarbon reservoir", The Leading Edge, Oct. 2001, pp. 1154-1163.
Bell, JS, "Rock at Great Depth", vol. 3, Balkema Rotterdam, 1990.
Mouchet, JP, et al., Abnormal pressures while drilling, from Elf Aquitaine Manuals Techniques 2, 1989, p. 76.

* cited by examiner

*Primary Examiner*—Tung S Lau
*Assistant Examiner*—Xiuquin Sun

(57) ABSTRACT

A method and system for assessing pore fluid pressure behaviour in a region of interest in a subsurface formation below an earth surface. A stress value representative of formation stress is determined in a measurement region in the subsurface formation. Signals representing the stress are produced using a measurement arrangement. The measurement region is located displaced from the region of interest. The stress value is used to detect present of non-hydrostatic pore fluid pressure in the region of interest without having to enter the region of interest. To this end, a signal processing device can be arranged to receive the signals and utilize them to detect the presence of the non-hydrostatic pore fluid pressure behaviour.

16 Claims, 4 Drawing Sheets

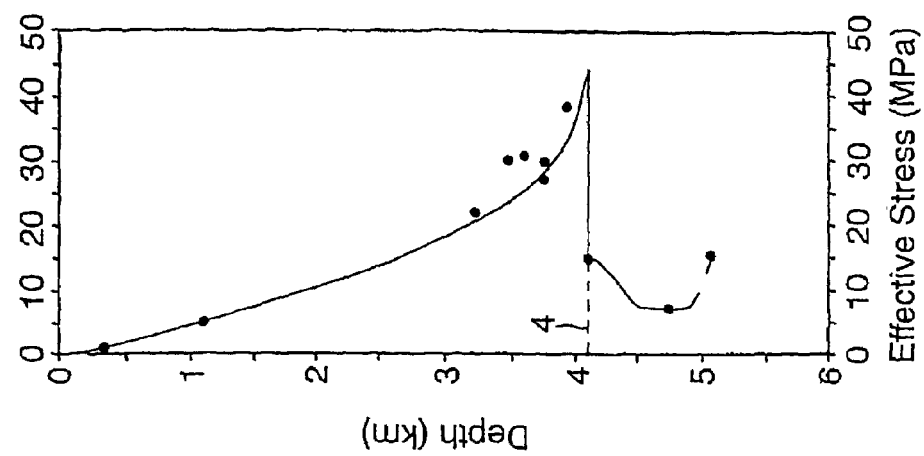
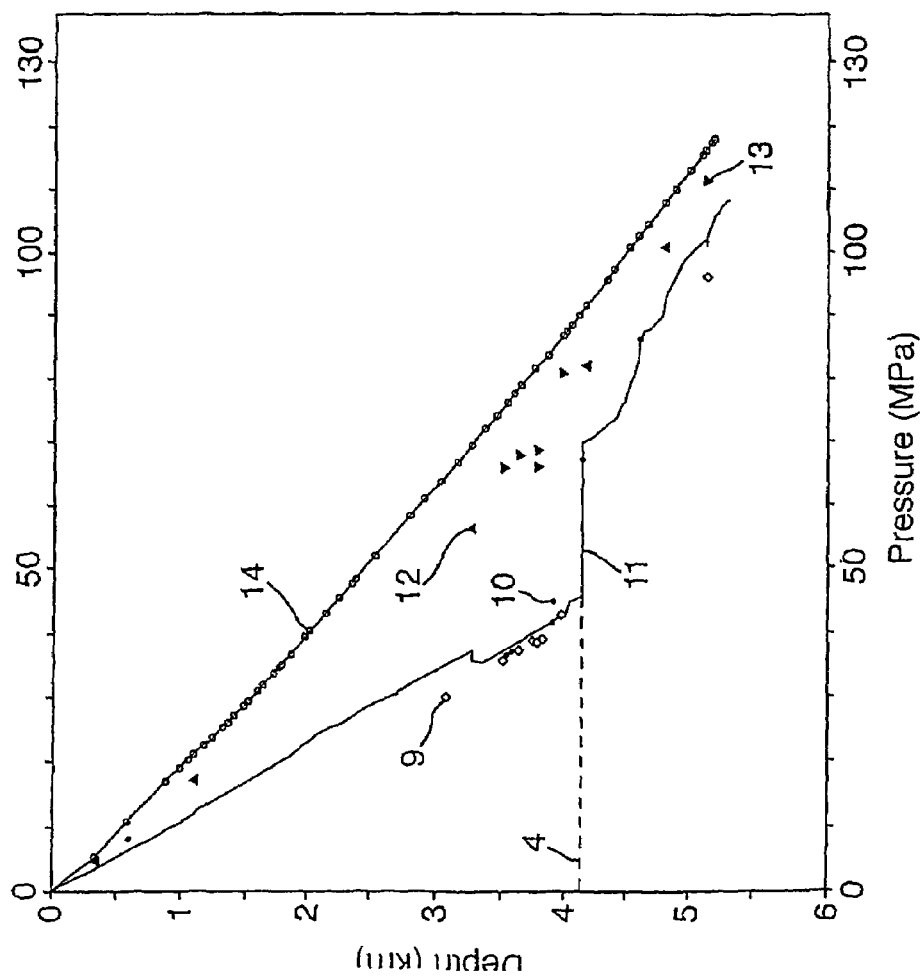

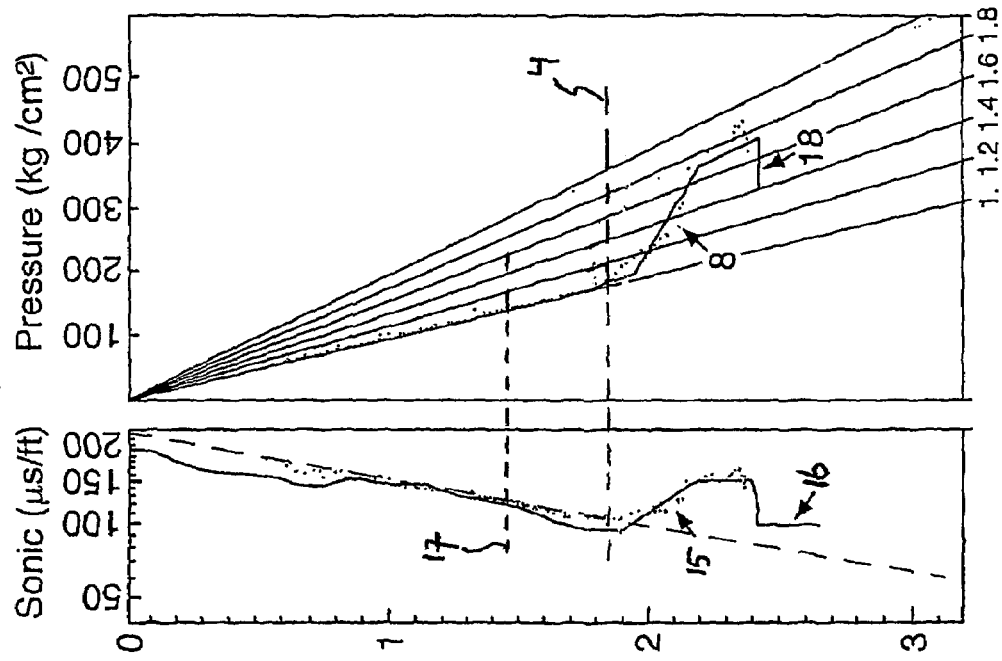
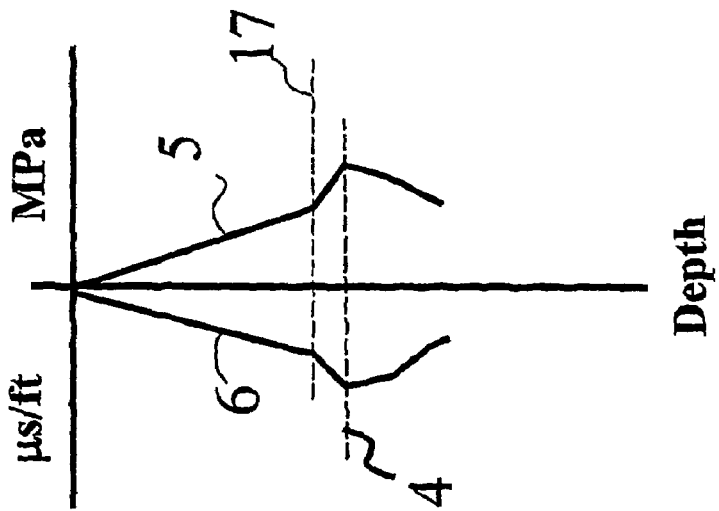
Fig. 4(b).
Fig. 4a

METHOD AND SYSTEM FOR ASSESSING PORE FLUID PRESSURE BEHAVIOUR IN A SUBSURFACE FORMATION

PRIORITY CLAIM

The present application claims priority of European Patent Application No. 03103958.9 filed Oct. 24, 2003.

FIELD OF THE INVENTION

The invention relates to a method of assessing pore fluid pressure behaviour in a region of interest in a subsurface formation. The invention also relates to a system for assessing pore fluid pressure behaviour in a region of interest.

BACKGROUND OF THE INVENTION

Pore pressure of formation fluids in a subsurface formation can either show normal or hydrostatic behaviour whereby the pore pressure is hydrostatically determined by the weight of the overhead fluid column, or abnormal or non-hydrostatic behaviour whereby other factors than the weight of the overhead fluid column affect the pressure of the formation fluid. There are generally two types of non-hydrostatic behaviour identified, being over pressure whereby the pore pressure exceeds the hydrostatically determined pore pressure and under pressure whereby the pore pressure is less than the hydrostatically determined pore pressure.

Generally, the pore fluid pressure in a subsurface formation is determined with a so-called repeat formation test within the region of interest, or particularly within a depth range of interest.

In particular in the field of exploration drilling, there is a desire to predict an abnormality in pore fluid pressure in a region of interest that lies ahead of the drill bit. It is particularly desirable to be able to predict a region of over pressure in the formation, for an over pressure can give rise to influx of formation fluid in the bore hole, a so-called kick which can result in a blow-out.

Currently available pore fluid pressure prediction techniques in the art are normally based on determining a deviation in the porosity from a normal compaction trend of the formation, which determines the porosity. Such a technique is thus based on determining undercompaction and is referred to as an undercompaction technique. In such techniques it is generally assumed that over pressure is associated with abnormally high sediment porosity. However, over pressure does not always have a strong porosity-based signature, because over pressure can be caused by varying geological processes and are frequently related to complex geological structures, such as diapirs and overthrusts.

SUMMARY OF THE INVENTION

It is therefore an object of the invention to provide a method of assessing fluid pressure behaviour in a region of interest in a subsurface formation that adds more reliability.

In accordance with the invention, ther is provided a method of assesing pore fluid pressure in a region of interest in a subsurface formation below an earth surface, the method comprising: determining a stress value representative of formation stress in a measurement region of the subsurface formation being located displaced from the region of interest; and detecting presence on non-hydrostatic pore fluid pressure in the region of interest using the stress value.

Prior to assessing the behaviour of pore fluid pressure in the region of interest in a way as defined above:

a drill bit can be provided on a lower end of a drill string; whereby the lower end of the drill string is lowered in a bore hole in the subsurface formation; while during assessing pore fluid pressure in the region of interest:

the drill bit can be operated to deepen the hole.

During drilling a bore hole the region of interest can be the region that is about to be drilled. This method can therefore be used to obtain an early warning during a drilling operation of a sudden abnormality in the pore fluid pressure in the region that is about to be drilled. This warning sign can be used to avoid a kick in case that the abnormality is an over pressure, or formation damage by intrusion of drilling fluid can be avoided in case that the abnormality is an under pressure.

The invention is also embodied in a system for assessing pore fluid pressure behaviour in a region of interest in a subsurface formation below an earth surface, the system comprising:

a measurement arrangement capable of producing a signal representing a stress value representative of the formation stress in a measurement region of the subsurface formation; and a signal processing device arranged to receive the signal and utilize the signal to detect presence of non- hydrostatic pore fluid pressure in the region of interest, which region of interest is located displaced from the measurement region.

The measurement arrangement can, for instance, be a system suitable for remote geophysical detection techniques, such as a 3-D or 4-D (i.e. time-lapse) seismic technique.

In addition, the measurement system preferably includes at least a measurement-while-drilling device that is installable on a drill pipe for lowering into a bore hole such that the measurement while drilling device can reach the measurement region. For the purpose of this specification, a measurement-while-drilling device is to be construed to include a measurement-ahead-of-the-bit device, whereby the measurement region lies ahead of the measurement-ahead-of-the-bit device when seen in drilling direction.

These and other features and preferred features of the invention will be elucidated below by way of example and with reference to an accompanying drawing.

BRIEF DESCRIPTION OF THE DRAWINGS

In the accompanying drawings:

FIG. 3 (parts a and b) shows field data of (a) pore fluid pressure and true formation stress and (b) corresponding effective horizontal stress in an example bore hole (data derived from J. S. Bell, in proceedings of "Rock at Great Depth", Volume 3, Balkema Rotterdam, 1990);

FIG. 4 (parts a and b) shows (a) schematic representations and (b) field data of a sonic analysis from seismic interval velocities as compared to the pressure profile (data from J. P. Mouchet and A. Mitchell in "Abnormal pressures while drilling" from Elf Aquitaine Manuals Techniques 2, 1989)

DETAILED DESCRIPTION OF THE DRAWINGS

In accordance with the invention, pore fluid pressure in a region of interest in a subsurface formation below the earth surface is assessed. A stress value representative of formation stress is determined in a measurement region of the subsurface formation being located displaced from the region of interest, and the stress value is used for detecting presence of non-hydrostatic pore fluid pressure in the region of interest.

It has been found that the formation stress in a region displaced from the region of interest, is affected by the forniation pore fluid pressure in the region of interest. The invention is thus based on the insight that, observation of the formation stress in the measurement region outside the region of interest provides information on the pore fluid pressure in the region of interest. For instance, pore fluid information can already be obtained with respect to a region that has not yet been reached in a drilling operation.

It is an advantage of the invention that results can for instance be used in deciding about which mud weight to employ and/or setting casing.

Figure 1:
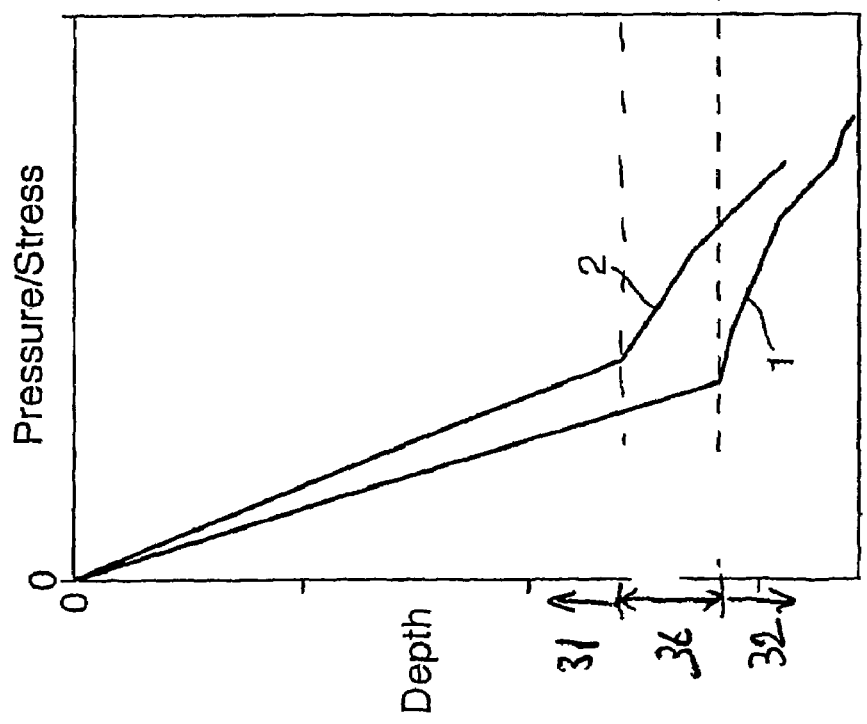
FIG. 1 shows a schematic example of pore fluid pressure and principal stress evolution over depth in a subsurface formation.

FIG. 1 graphically shows lines that schematically represent pore fluid pressure (line 1) and true minimum principal stress (line 2), as a function of depth in a subsurface formation below the earth's surface. The lines are a schematic example for purpose of explaining the invention. Examples of measured data will be shown below.

At shallow depths 31+36, down to the depth indicated by the dashed line 4, the pore fluid pressure increases essentially hydrostatically with depth. Dashed line 4 corresponds to the top of an over pressure region 32, and forms a pressure boundary between the normal and abnormal pressure regions. The pore fluid pressure gradient in region 32 increases, i.e. the pore fluid pressure increases at a higher rate than the hydrostatic rate in the region 31 at depths below the dashed line 4.

As can be seen in FIG. 1, the true minimum principal stress (line 2) gradient also increases, i.e. it changes at a higher rate in a depth range around line 4 than is the case for shallow depths 31, but the higher gradient already starts at a shallower depth than the onset of the over pressure region that is indicated by dashed line 4. The shallower depth is indicated by dashed line 17. Between line 4 and line 17 there is a precursor zone 36 where the pressure still behaves hydrostatic, but where the effective stress increases due to an increase in total stress.

Apparently, the pore fluid pressure and the formation stress are not only coupled within the same region of the formation as has been known and modelled before, but the formation stress in a region above the region of interest is affected by an abnormality in the pore fluid pressure in the region of interest.

The invention, in one aspect providing a method wherein a stress value representative of formation stress is determined in a measurement region and the stress value is used for detecting presence of an abnormality in the pore fluid pressure behaviour in the region of interest which is located displaced from the measurement region, is based on utilizing this observation.

The method of the invention is stress-based rather than porosity-based, and therefore it is less dependent on porosity state of the formation than is the case in undercompaction techniques. Added reliability is gained compared to porosity-based methods, at least in that a high pore pressure is detectable in cases where high pore pressure is not accompanied by undercompaction.

The method of the invention can be utilized on its own merits, or as a complementaxy technique in combination with existing methods.

The region of interest may in some preferred cases be a subsurface hydrocarbon reservoir.

Without intending to be limited by the following explanation, it is remarked that in a case where the pore fluid pressure in the region of interest is relatively low, for instance due to depletion of a hydrocarbon reservoir, there can be a so-called arching effect in the formation above the region of interest leading to a measurable effect in the stress in the formation above the region of interest. Although other factors may be determined to cause the same effect, it is presently suggested that in the opposite case of an over pressure in the region of interest, the measurable effect in the stress in the formation above the region of interest may be due to a so-called reversed arching effect. The signature in the stress measurements in the measurement region may be different in respect of under pressure and over pressure.

Figure 2:
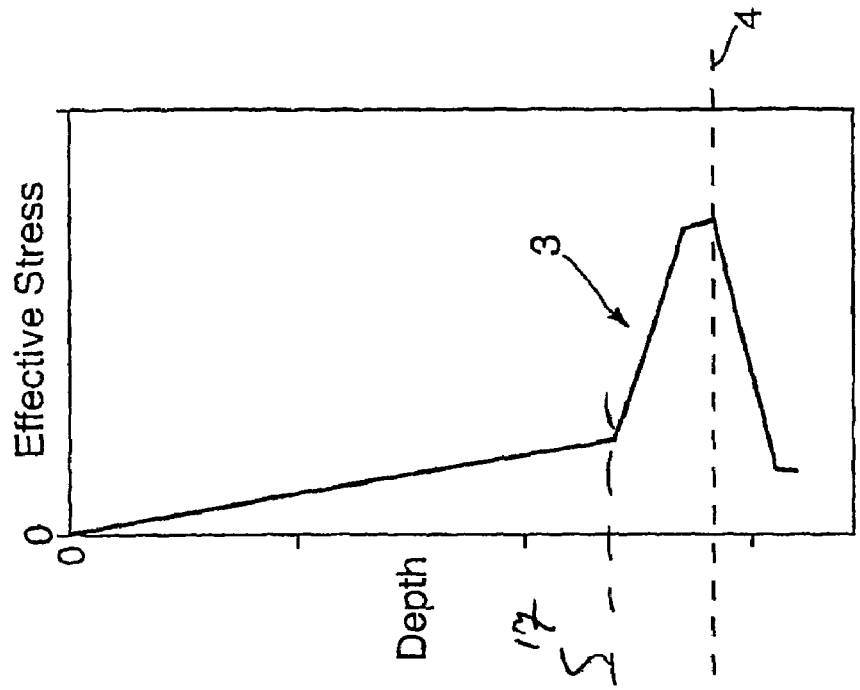
FIG. 2 shows a schematic example of the effective principal stress for the case of FIG. 1.

In FIG. 2 is can be seen that the corresponding minimum effective principal stress (line 3), which is here taken to be the minimum principal stress minus the pore fluid pressure at the same depth, shows a pronounced peak around a pressure boundary where hydrostatic pressure changes into the over pressure region, which pressure boundary is indicated by the dashed line 4. In other words, the onset of the over pressure region appears as a reversal in the effective principal stress signal. The reversal is preceded by a significant increase in the rate of the stress change with depth, which can be detected to provide an early warning of the upcoming pressure boundary to the over pressure region.

The method is particularly advantageous in a case where the pore fluid pressure in the region of interest is an over pressure, being a pore fluid pressure that is higher than the purely hydrostatic pressure, because the stress in the region of measurement can then be used to predict the over pressure and thereby a kick during drilling can be avoided. If successfully applied prior to drilling, the method will assist in exploration of hydrocarbons in high pressure regions an in optimum well design.

In an embodiment of the invention, the use of the stress value for detecting non-hydrostatic pore fluid pressure in the region of interest includes inferring an effective stress value representative of the difference between the formation stress in the measurement region and a value of pore fluid pressure in the measurement region.

An inference of effective stress can be simpler and take less rig time in a drilling operation than a true stress measurement. Moreover, since the true stress in the measurement region adjacent to for instance an over pressure region already increases while the pore fluid pressure in the measurement region may still be hydrostatically detennined. Therefore, an over pressum in the region of interest is accurately predictable by an increase in the effective stress value just adjacent the onset of the over pressure region.--

In an embodiment of the invention, determining the stress value includes determining a stress value representative of a principal formation stress in one of the three principal stress directions in the stress tensor.

The principal direction can be selected to provide an optimal sensitivity in the measurement region to an abnormaiity in the pore fluid pressure in the region of interest. It has been found that the minimal principal stress direction provides the most optimal measurability. Often, the minimal principal stress direction coincides with the horizontal direction.

In an embodiment of the invention, two or more stress values or effective stress values, are inferred, each at a different depth in the measurement region. Herewith a depth- survey can be produced.

In particular, a variation of the two or more stress values or effective stress values as a flmction of their depths is inferred, and compared to a nominal value. By monitoring a deviation from the nominal value, information is obtained about a possible abnormality in the pore fluid pressure m the region of interest.

Preferably, three or more stress values or effective stress values are inferred, which allows for determining a deviation from a trend in a depth-survey in the measurement region. Such a deviation from a trend can contain pore fluid pressure information relating to the region of interest.

FIG. 3 shows example field results of various tests relating to formation stress determination and pore fluid pressure assessment in a subsurface bore hole. The following table explains the symbols used.

| Reference numeral | Test or physical entity |
|---|---|
| 9 | Drill stem test |
| 10 | Repeat formation test |
| 11 | Mud weight pressure |
| 12 | Leak off test |
| 13 | Initial feedrate pressure |
| 14 | Overburden pressure |

Line 11 indicates the mud weight pressure in the bore hole. As can be seen by symbols 10 in FIG. 3a, at a depth of 4095 m an over pressure region starts. At a depth of approximately 3700 m, i.e. some 400 m above the onset of the over pressure region, the minimum (horizontal) stress starts to deviate from a straight line. This is more readily observable in FIG. 3b, where the effective minimum stress is depicted. This graph shows a pronounced peak starting at 3700 m. Thus the minimum stress determination, or preferably the effective minimum stress inference, can be utilized to predict the upcoming abnormality in the pore fluid pressure at deeper depth.

It is remarked that additional field data has been disclosed in the mentioned article by J. S. Bell, in particular in FIG. 14 therein which is herewith incorporated by reference.

Based on field data, it is now generally concluded that the peak in the effective minimum stress becomes apparent starting from tens to hundreds of meters above the onset of an over pressure region. It is clear that in a case of drilling a new bore hole, the increase in the principal stress rate in depth can be used as a warning signal for an over pressure region that is about to be reached, so that a kick can be avoided by selecting and circulating an appropriate increased mud density for continued drilling.

Suitably, a pressure boundary wherein the behaviour of the pore pressure changes from hydrostatic to non-hydrostatic is detected, preferably while the pore pressure in the measurement region is still hydrostatically determined. Suitably, a deviation of the pore fluid pressure in the region of interest from the hydrostatical pore fluid pressure in the region of interest is detected.

Line 5 in FIG. 4a schematically shows an effective principal stress as a function of depth, similar as shown before. The approximate pressure boundary, representing the onset of the over pressure region coming from the hydrostatic region, is as before indicated with a dashed line 4. Line 6 in FIG. 4a schematically shows the sonic signal (or seismic velocity), which also reveals a reversal in the signal at the depth indicated by dashed line 4 and an abrupt stress rate increase at the depth indicated by dashed line 17. Detecting this trend change in the effective stress at 17 can provide an early warning for the upcoming pressure boundary 4.

An example of a real measurement is shown in FIG. 4b, wherein symbols 15 represent data points taken by logging the shales in the well, and line 16 is a pseudo-sonic from a seismic model. The reversal in the sonic signal is seen at 4. The right hand side of the FIG. 4b shows the corresponding pressure profile with data points 8 and a pressure trend 18 from a model. Dashed line 4 indicates the pressure boundary between a region wherein the pressure increases hydrostatically and an over pressure region at higher depth where a pressure abnormality is apparent. The dashed line 17 indicates the depth at which an increase in the stress rate is detectable, which is less deep than dashed line 4. It is therefore concluded that geophysical measurements such as seismnic measurements or sonic measurements can be used for determining the formation stress for pore fluid pressure prediction as described herein.

In practice, the method described above can be used during a drilling operation, particularly during an exploration drilling operation. An example of such a drilling operation is exemplified with reference to FIG. 5, wherein a system for determining a pore fluid pressure in a region of interest in a subsurface formation below an earth surface is schematically shown in an embodiment including a drill string 21 lowered in a bore hole 20 in a subsurface geological formation 22. On a lower end thereof, the drill string 21 is provided with a drill bit 23. The drill bit may be operated to deepen the bore hole during assessing the pore fluid pressure in the region of interest.

The drill string may be provided with a measurement while drilling sub including one or more receivers 24 higher up in the drill string 21, for providing a sonic signal from which the formation effective stress can be determined as drilling of the hole progresses. The receiver 24 can for instance pick up bit noise that propagates through the formation 22 and defines a measurement region 30. Alternatively or in addition, one or more receivers 25, 26 in proximate other wells can be employed.

Figure 5:
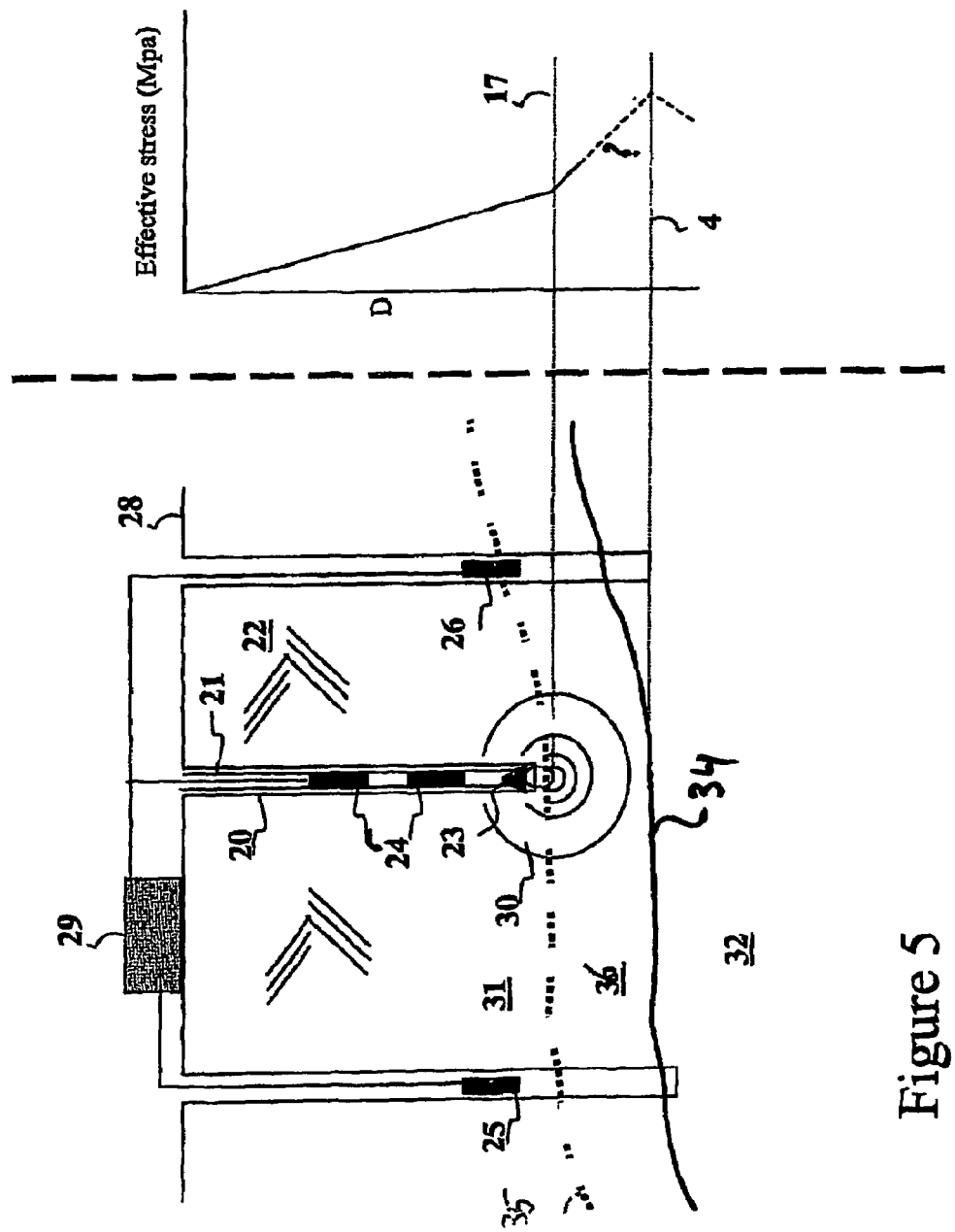
FIG. 5 schematically shows a system for determining a pore fluid pressure in a region of interest in a subsurface formation below an earth surface employing the invention.

In the situation of FIG. 5, there is a hydrostatic region 31 separated by a pressure boundary 34 from a region 32 of over pressure. Just above the pressure boundary 34 is the precursor zone 36, indicated between lines 34 and imaginary line 35, where the effective stress increases whereas the pore pressure gradient is still constant.

Global information of the pressure boundary 34 and the precursor zone 36 can be available from experience and data gained while previously drilling the proximate wells, and for instanced from a general seismic survey of the site. However, it is of importance to have an accurate prediction of the depth at which the pressure boundary 34 will be encountered while drilling bore hole 20. Such prediction is provided by detecting the precursor zone 36 as it is entered by the drill bit.

Data or signals from the measurement while drilling sub or from the proximate receivers 25, 26 can be transmitted to a signal processing device 29 arranged to receive the data or signals and utilize these to determine the effective stress in the region of interest, which region of interest is located displaced from the measurement region ahead of the drill bit 23. Other data available at the rig, such as the depth of the drill bit 23 below the surface 28, can also be fed to the signal processing device 29. The signal processing device 29 can thus produce a stress signal as a function of depth, of which a schematic example is shown in the right hand side of FIG. 5. The pore pressure is calculated from the determined total and effective stresses. The stress behaviour is known for depths above the drill bit 23 and somewhat beyond the depth of the drill bit.

The stress behaviour shows an abrupt increase in stress rate at 17, which can be interpreted as the start of the precursor zone 36 at the base of region 31 of normal pressure behaviour and adjacent to region 32 of a pressure abnormality ahead of the drill bit 23. This, in turn, can be interpreted as a warning for the upcoming pressure boundary 34 between region 31 and region 32.

The method described above can also be used prior to drilling using for instance 4-D seismic data to assist in exploration and well design in high pressure fields.

We claim:

1. A method of assessing pore fluid pressure behaviour in a region of interest in a subsurface formation below an earth surface, the method comprising:
    determining a stress value represenative of formation stress in a measurement region of the subsurface formation displaced from the region of interest; and detecting presence of non-hydrostatic pore fluid pressure in the region of interest using the stress value:
    wherein detecting presence of non-hydrostatic fluid pressure comprises detecting a precursor zone wherein the pore fluid pressure is hydrostatically determined and a stress gradient increases.

2. The method of claim 1, wherein detecting presence of non-hydrostatic fluid pressure comprises detecting a pressure boundary wherein the pore fluid pressure changes from hydrostatic to non-hydrostatic.

3. The method of claim 1, wherein the fluid pressure in the measurement region is hydrostatic.

4. The method of claim 1, wherein the measurement region of the subsurface formation is located less deep as seen from the earth surface than the region of interest.

5. The method of claim 4, wherein the measurement region of the subsurface formation is located above the region of interest.

6. The method of claim 1, wherein using the stress value for detecting non-hydrostatic pore fluid pressure in the region of interest comprises inferring an effective stress value representative of the difference between the formation stress in the measurement region and a value of pore fluid pressure in the measurement region.

7. The method of claim 1, wherein detecting non-hydrostatic pore fluid pressure in the region of interest comprises using a geo-mechanical model of the subsurface formation.

8. The method of claim 1, wherein determining the stress value comprises determining a principal stress value representative of the horizontal formation stress in the measurement region.

9. The method of claim 1, wherein determinng the stress value comprises performing a geophysical measurement, such as a seismic measurement or a sonic measurement, to obtain geophysical data, and processing the geophysical data to obtain the stress value.

10. The method of claim 1, wherein determining the stress value comprises determining two or more stress values each at a different depth in the measurement region.

11. The method of claim 10, further comprising inferring effective stress values for each of the stress values, which effective stress values are representative of the difference between the formation stress at the corresponding depths in the measurement region and the value of the pore fluid pressure at substantially the same depth in the measurement region.

12. The method of claim 11, further comprising inferring a variation of the two or more effective stress values as a function of their depths and comparing to a nominal value.

13. The method of claim 1, wherein prior to assessing pore fluid pressure behaviour in the region of interest: a drill bit is provided on a lower end of a drill string; and the lower end of the drill string is lowered in a bore hole in the subsurface formation, and wherein during assessing the pore fluid pressure behaviour in the region of interest: the drill bit is operated to deepen the hole.

14. The method of claim 4, wherein the measurement region of the subsurface formation is located above the region of interest.

15. A system for assessing pore fluid pressure behaviour in a region of interest in a subsurface formation below an earth surface, the system comprising: a measurement arrangement for producing a signal representing a stress value representative of the formation stress in a measurement region of the subsurface formation; and a signal processing device arranged to receive the signal and utilize the signal to detect presence of non-hydrostatic pore fluid pressure in the region of interest, which region of interest is located displaced from the measurement region;
    wherein the signal processing device detects presence of non-hydrostatic fluid pressure by detecting a precursor zone wherein the pore fluid pressure is hydrostatically determined an a stress gradient increases.

16. The system of claim 15, wherein the measurement system includes at least a measurement-while-driling device that is installable on a drill pipe for lowering into a bore hole such that the measurement-while-drilling device can reach or approach the measurement region.

* * * * *